April 9, 1957     L. B. LUSTED     2,788,453
SELF-TIMING X-RAY APPARATUS
Filed May 16, 1955     3 Sheets-Sheet 1
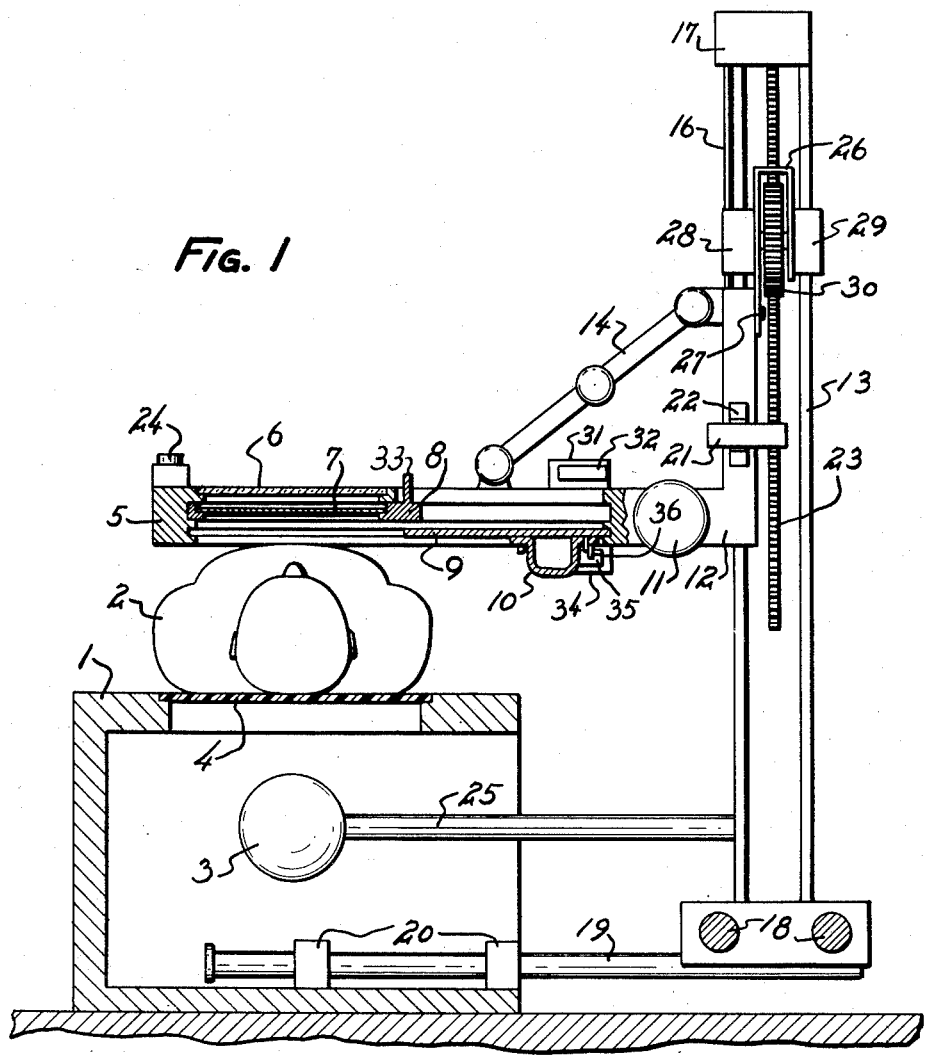
INVENTOR
LEE B. LUSTED
BY Lippincott and Smith
ATTORNEYS

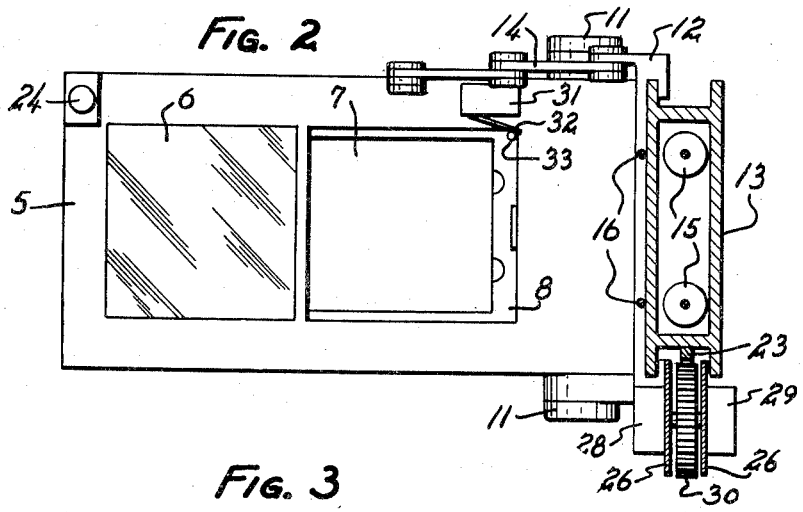
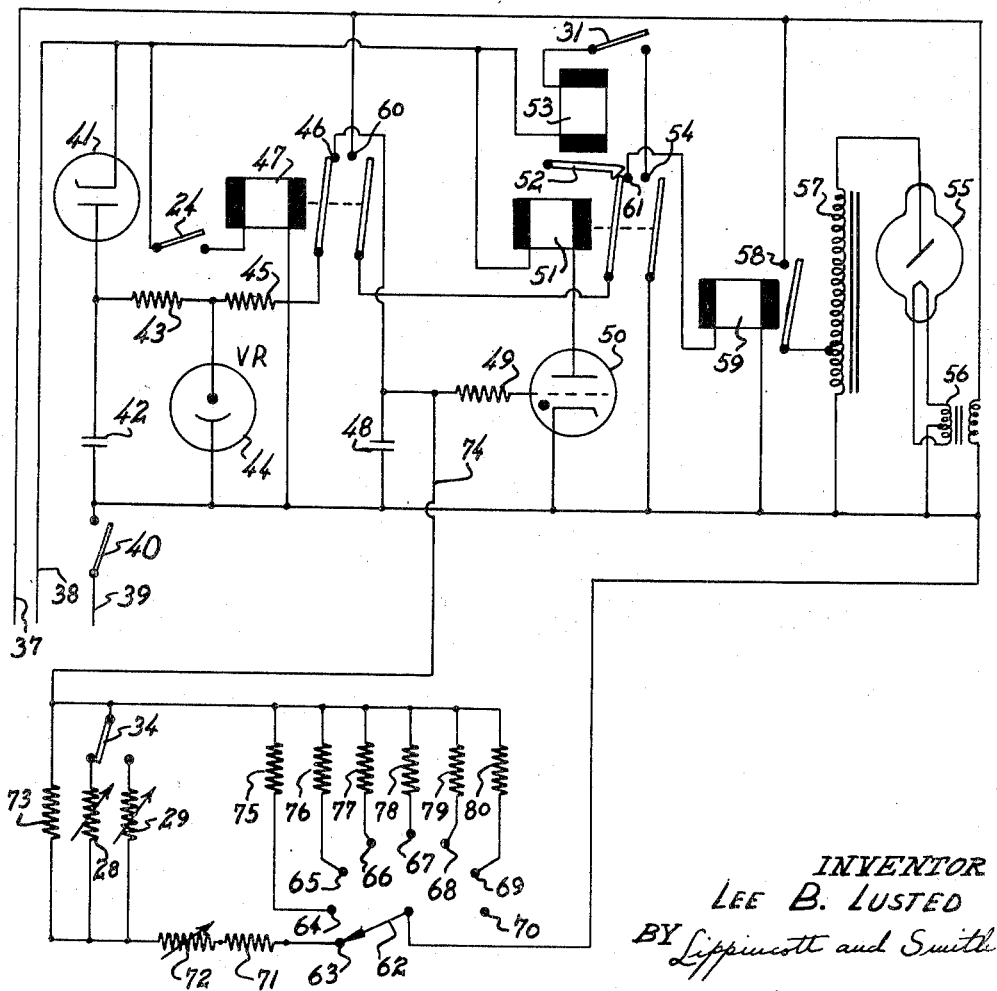

United States Patent Office 2,788,453
Patented Apr. 9, 1957

2,788,453

SELF-TIMING X-RAY APPARATUS

Lee B. Lusted, Chevy Chase, Md.

Application May 16, 1955, Serial No. 508,531

15 Claims. (Cl. 250—95)

This invention relates to X-ray apparatus having self-setting timing means providing exposure times automatically related to the thickness of the X-rayed subject.

In making X-ray photographs the optimum film exposure time should be accurately determined and regulated to give a film density and contrast which are most pleasing to the radiologist. It is known that the optimum exposure time varies with the thickness of an X-rayed subject, and in particular that the optimum exposure time for making a "G. I. Series" or barium enema spot film, depends upon the subject's abdominal thickness. For example, with a particular "fluoroscope" type X-ray machine having a 2 millimeter aluminum filter, an 18-inch target-to-table-top distance, and an X-ray tube operated at 90 kilovolts and 150 milliamperes, it may be found that the optimum exposure time, producing a density and contrast most pleasing to a radiologist, is $\frac{1}{10}$ second for a G. I. Series of a patient having an abdomen 19 cm. thick, and is 2 seconds for a patient having an abdomen 30 cm. thick. For other abdominal thicknesses, or with a different type of X-ray apparatus, or with a radiologist having different preferences as to density and contrast, different values of exposure time will provide the best results.

By experiment, or by calculations known to those skilled in the art, there can be prepared for any specified type of X-ray apparatus a curve showing the optimum exposure time corresponding to any abdominal thickness of the X-rayed subject. In general, this curve will be the sum of two mathematical functions: an exponential function which is related to the amount of X-ray energy absorbed by subjects of different thickness, and an inverse square-law function which is related to the distance of the film from the X-ray source. The latter function is a constant with certain types of apparatus where a predetermined standard setting of the film-to-source distance is used in making X-ray photographs of the type under consideration.

According to one technique heretofore used, the desired exposure time is determined by the radiologist on the basis of his past experience, or from previously prepared data, and a timing mechanism is manually set to the selected exposure time. However, this procedure is time consuming, and in addition it presents an opportunity for human error which may result in improperly exposed photographs. Accordingly, an object of this invention is to provide self-timing X-ray apparatus in which the optimum exposure time is automatically set by normal adjustments of the apparatus to accommodate the patient.

In accordance with another technique heretofore used, self-timing X-ray apparatus has been provided with photoelectric means for measuring and integrating the X-ray exposure. However, photoelectric timing apparatus is expensive, relatively complex, and easily damaged. Accordingly, another object of this invention is to provide X-ray timing apparatus which is simple, relatively rugged, and inexpensive to manufacture. Other objects and advantages will appear as the description proceeds.

Briefly stated, in accordance with one aspect of this invention, X-ray apparatus is provided with two members which can be positioned in contact with front and back portions, respectively, the subject to be X-rayed, for example, in contact with front and back portions of the subject's abdomen. One of these two members is movable relative to the other for accommodating subjects of different thickness. A potentiometer, or rheostat, is provided with mechanical connections such that the electrical resistance of the potentiometer is automatically adjusted by movement of the aforesaid movable member, so that the potentiometer resistance is a predetermined function of the subject's abdominal thickness. This resistance is part of an electronic timing circuit which automatically controls the film exposure time.

The invention will be better understood from the following description taken in connection with the accompanying drawings, and its scope will be pointed out in the appended claims. In the drawings, Fig. 1 is a schematic elevation, partly in section, showing X-ray apparatus embodying principles of this invention;

Fig. 2 is a fragmentary top view of a portion of the apparatus shown in Fig. 1;

Fig. 3 is a simplified circuit diagram showing the timing circuit of the same X-ray apparatus.

Figure 4:
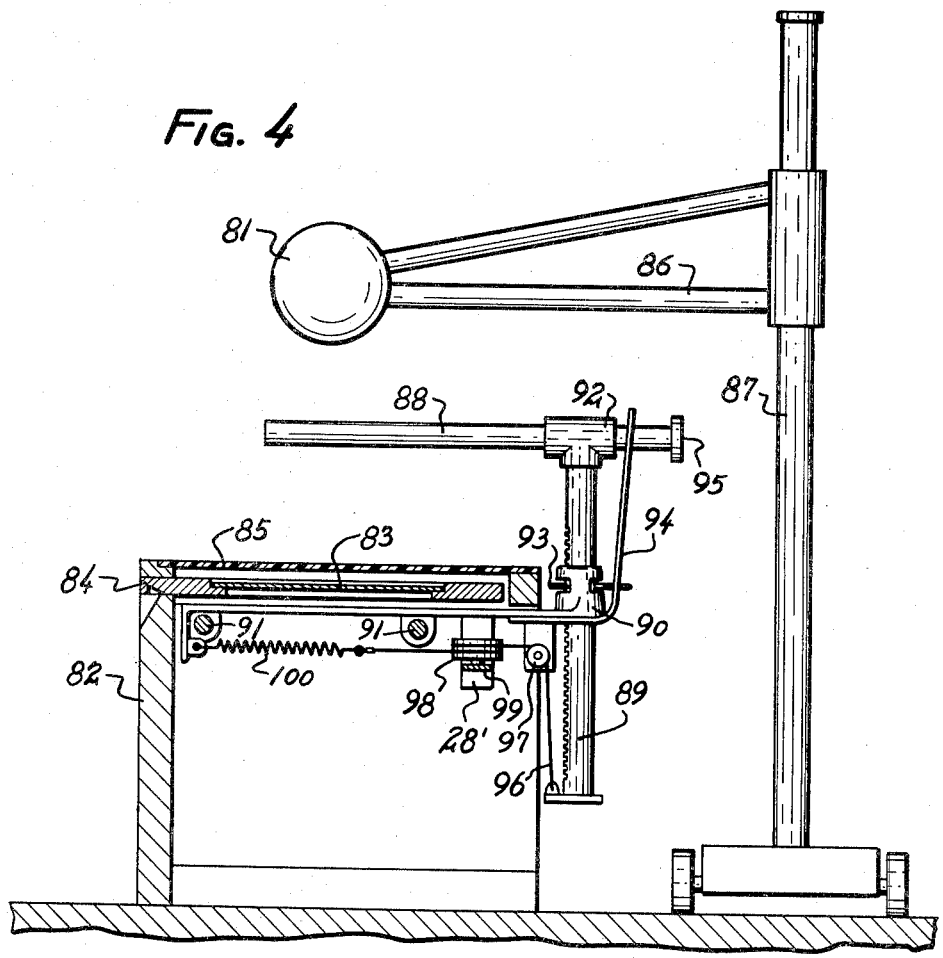
Fig. 4 is a schematic elevation, partly in section, of other X-ray apparatus embodying principles of this invention.

Referring now to Figs. 1 and 2 of the drawing, there is illustrated X-ray apparatus of a general type heretofore extensively used, which has been modified in accordance with principles of this invention in the manner herein explained. The X-ray apparatus shown in Figs. 1 and 2 is of the type generally known in the art as a "fluoroscope," since it includes a fluoroscopic screen which may be used in making direct visual X-ray examinations. However, photographs may also be made with this apparatus, and it is in connection with X-ray photographs that the present invention is particularly useful.

The X-ray apparatus illustrated includes a conventional table 1 adapted to support an X-rayed subject 2. In this type of machine, it is customary to provide means for adjusting table 1 to a horizontal position or to a vertical position, selectively, so that subject 2 can be X-rayed either in a prone position, as shown, or in a standing position. An X-ray tube is contained in a cylindrical housing 3 located below the top of table 1 as shown. X-rays produced by the tube pass through a relatively thin sheet 4 of plastic, usually bakelite, which forms at least a portion of the table top. A frame 5 supports a fluoroscopic screen 6 above or in front of the subject 2, so that direct visual X-ray examination of the patient can be made when desired.

For making X-ray photographs, there is provided a conventional cassette 7, containing photographic film. Cassette 7 preferably is supported by a drawer 8 which slides within grooves of frame 5, so that cassette 7 can be positioned directly over subject 2 and under the screen 6, as shown in Fig. 1, for exposing the photographic film to X-rays. Drawer 8 can be moved along the grooves in frame 5 to carry cassette 7 to the position shown in Fig. 2, where the drawer and the cassette are out of the way when making fluoroscopic examinations, and where the cassette can be removed from the drawer for the purpose of developing and replacing the photographic film within the cassette. Where film-holding means of the type described are not provided within the X-ray apparatus, X-ray photographs can be made by simply fastening a film holder to the screen 6.

Frame 5 may also support a metal slide 9 having bayonet studs to which a pressure cone 10 may be attached. When used, pressure cone 10 presses upon the subject's abdomen to assist in holding X-rayed parts of the subject's anatomy in a desired position. The pressure cone is used by raising frame 5 slightly and moving slide 9 forward (toward the left in Fig. 1) to bring pressure cone 10 into position in contact with the abdomen of subject 2. The pressure cone generally is a hollow cup-shaped aluminum member about three or four inches deep.

Frame 5 is pivotally attached at hinge 11 to a bracket 12 mounted on a post 13. During the making of X-ray photographs, bracket 5 is held in the horizontal position shown by a folding arm 14. Bracket 12 can slide up and down on post 13 to adjust the spacing between the top of table 1 and the bottom of frame 5, for accommodating X-rayed subjects of different thickness. The weight of the bracket and frame is balanced by counterweights 15 attached to bracket 12 by wires 16 which pass over pulleys located in the housing 17 at the top of post 13. Post 13 is movable horizontally along tracks 18 supported by rods 19 which are slideably supported by bearings 20 attached to the frame of table 1. Accordingly, the horizontal position of post 13 can be adjusted, and the vertical position of frame 5 can be adjusted, to bring fluoroscopic screen 6 or cassette 7 into any desired position relative to subject 2. To hold frame 5 in a desired vertical position, a latch 21 mounted on frame 12 by a hinge 22 can be brought into engagement with a rack 23 fixed to one side of post 13, as shown.

A push button 24 may be located at the front of frame 5, as shown, for starting operation of the X-ray tube. Other starting switches, such as a conventional foot switch electrically connected in parallel with switch 24, may be provided if desired. The tube housing 3 is preferably supported by bracket 25 which is attached to post 13 so that the X-ray tube is automatically moved to the correct position under subject 2 whenever post 13 is moved to bring screen 6 or cassette 7 into the desired position above a portion of the subject's anatomy which is to be X-rayed. In this machine, the X-ray tube is always a fixed distance below the top of table 1—about 18 inches, for example.

The parts of Figs. 1 and 2 described thus far constitute a substantially conventional X-ray fluoroscope of an extensively-used type. In making X-ray photographs, such as a "G. I. Series" or barium enema spot film, the subject lies upon table 1 so that his back is in contact with the table top, as shown in Fig. 1, and the position of frame 5 is adjusted so that the bottom of frame 5 is in contact with the subject's abdomen. Cassette 7 is moved to the position shown in Fig. 1, and push button switch 24, or some other switch provided for this purpose, is closed to start operation of the X-ray tube for exposing the photographic film contained within cassette 7. Upon the expiration of a predetermined exposure time, the X-ray tube is automatically cut off by means hereinafter described, slide 8 is moved back to the position shown in Fig. 2, and cassette 7 is removed so that the photographic film within the cassette can be developed.

In accordance with the present invention, novel self-setting timing means are provided for automatically shutting off the X-ray tube upon expiration of a film exposure time which has an optimum value corresponding to the abdominal thickness of subject 2. In the embodiment of the invention illustrated in Figs. 1 and 2, a U-shaped support 26 is fixedly attached to bracket 12 by suitable means such as screws 27. Mounted upon support 26 there are two potentiometers or rheostats 28 and 29 having rotative shafts connected to a spur gear 30 which engages the rack 23 fixedly attached to post 13. Whenever bracket 12 is moved up or down on post 13 to adjust the spacing between the top of table 1 and the bottom of frame 5, gear 30 rolls along rack 23 and rotates the shafts of potentiometers 28 and 29 to adjust the resistance values of the two potentiometers. Accordingly, when the bottom of frame 5 is brought into contact with the abdomen of subject 2, the respective resistance values of potentiometers 28 and 29 are automatically adjusted in accordance with the abdominal thickness of the subject. These resistance values are used to control timing circuits hereinafter described.

An electrical switch 31 mounted on the top of frame 5, has a switch arm 32 which is depressed by a vertical pin 33 attached to the top of drawer 8 when drawer 8 is moved backward to the position shown in Fig. 2. Thus switch arm 32 is depressed whenever drawer 8 is placed in the rear position for removing cassette 7 to replace an exposed photographic film. A switch 34, mounted on the bottom of frame 5, has a switch arm 35 which is depressed by a vertical pin 36 attached to the bottom of slide 9 when slide 9 is moved backward to the position shown in Fig. 1. Thus switch arm 35 is depressed when pressure cone 10 is not used.

Refer now to Fig. 3, which is a simplified circuit diagram of the X-ray apparatus shown in Figs. 1 and 2 and novel timing means therefor. Electric power from any suitable source is supplied through leads 37, 38 and 39. In general, 60-cycle alternating current is supplied at 110 volts between leads 38 and 39 for operating the timing circuit, and at 220 volts between leads 37 and 39 for operating the X-ray tube. An on-off switch 40 is provided in the usual manner for turning the apparatus on and off. When switch 40 is closed, current is applied to conventional filament supply circuits, not shown, to heat the tube cathodes so that the tubes will be ready to operate when plate voltage is supplied. The closing of switch 40 does not in itself place the X-ray tube in operation.

A rectifier 41, connected in the circuit as shown, charges a capacitor 42 and provides direct current through a resistor 43 connected in series with a voltage regulator tube 44. In this manner there is provided across regulator tube 44 a relatively constant negative direct voltage, which may, for example, be —105 volts. This negative voltage is applied through a resistor 45 and the normally-closed contact 46 of a relay 47 to a capacitor 48, so that capacitor 48 is charged to a predetermined negative potential, which may be —105 volts for example. The coil of relay 47 is connected in series with switch 24 between leads 38 and 39, so that when switch 24 is closed, relay 47 is energized and relay contact 46 is opened.

Capacitor 48, which may have a value of one and a half microfarads, is connected in series with a resistor 49 between the control grid and the cathode of a grid-controlled tube 50, which may be a type 884 thyratron. Resistor 49 may advantageously have a value of 100,000 ohms. A relay 51 is connected in series with the plate of tube 50, as shown. Relay 51 is a latch-type relay having a latch 52 so arranged that when the coil of relay 51 is once energized, the relay contacts are held in actuated position by latch 52, despite any subsequent de-energization of the relay coil, until a release coil 53 is energized. When the release coil 53 is energized, latch 52 is raised and the relay contacts return to their original position. The release coil 53 is connected, in series with the switch 31 and a normally-open contact 54 of relay 51, across leads 38 and 39.

The X-ray tube 55 has a filament-type cathode connected to filament transformer 56, and has an anode connected to the secondary of a high-voltage autotransformer 57. The primary of autotransformer 57 is connected between leads 37 and 39 through a normally-open contact 58 of a load relay 59. The coil of load relay 59 is connected between leads 37 and 39 through a normally-open contact 60 of relay 47 and a normally-closed contact 61 of relay 51.

Exposure time settings are determined by a resistance network connected in parallel with capacitor 48. This network includes an eight-position selector switch 62 having a switch arm, connected to lead 39, which can be moved selectively into contact with any one of eight taps, indicated in the drawing by the reference numerals 63 through 70 inclusive. Three resistors 71, 72 and 73 are connected in series between tap 63 and a lead 74 connected to capacitor 48 as shown. Resistors 71, 72 and 73 may have values of 24,000 ohms, 20,000 ohms, and 1.24 megohms, respectively. Resistor 72 is preferably made adjustable for calibration purposes. A plurality of resistors, indicated in the drawings by reference numerals 75 through 80 inclusive, are connected between lead 74 and the taps numbered 64 through 69, respectively. Tap 70 may be a "floating" tap having no circuit connection. Typical values of resistors 75 through 80 may be 166,000 ohms, 134,000 ohms, 114,000 ohms, 68,000 ohms, 44,000 ohms, and 24,000 ohms, respectively.

The two potentiometers 28 and 29 are connected in series with switch 34 across resistor 73, as shown in the drawing. When slide 9 is at the rear of frame 5, as shown in Fig. 1, pin 36 depresses switch arm 35 and the contacts of switch 34 have the position shown in Fig. 3, whereby potentiometer 28 is connected in series with resistor 73. When slide 9 is moved to a forward position in frame 5, to bring pressure cone 10 into place above the abdomen of subject 2, switch 34 disconnects potentiometer 28 from the circuit and connects potentiometer 29 in parallel with resistor 73. Potentiometer 29 is identical to potentiometer 28, except that the two potentiometer shafts are connected to gear 30 with an angular offset such that the resistance of potentiometer 29 is slightly less than that of potentiometer 28 in any given position of bracket 12. In other words, when pressure cone 10 is in position against the abdomen of subject 2, resistor 29 has substantially the same resistance value as the resistance of potentiometer 28 when pressure cone 10 is moved to the rear of the frame and frame 5 is lowered into contact with the patient's abdomen. Consequently, switch 34 and potentiometer 29 provide automatic compensation for the thickness of the pressure cone when the pressure cone is employed.

The timing circuit operates in the following manner. Assume that all switches are initially in the position shown in Fig. 3. Switch 40 is closed first, and this applies electric power to heat the filaments of the tubes so that they will be ready for operation when plate voltage is applied. Rectifier 41 supplies current through voltage regulator tube 44 and provides direct voltage for charging capacitor 48 to supply the control grid of tube 50 with a negative potential of —105 volts. Since this potential is more negative than the cut-off potential of tube 50, the tube 50 is nonconductive. Assuming that frame 5 has been brought into position in contact with the subject's abdomen, potentiometer 28 has a resistance value which is related to the subject's abdominal thickness, and current flows through the resistance network connected in parallel with capacitor 48. The current through the resistance network does not discharge capacitor 48 at this time, because an equal amount of current is supplied through resistor 45 and relay contact 46 to keep capacitor 48 charged to the desired negative potential. Since relay contact 58 is open, no anode voltage is supplied to tube 55 and the X-ray tube is inoperative.

When the radiologist is ready to make a photograph, he closes switch 24, or any other switch which may be connected in parallel with switch 24. Ths energizes the coil of relay 47 and closes contact 60. There now is a closed circuit through relay contacts 60 and 61 to energize the coil of load relay 59, so that relay contact 58 is closed and the primary of autotransformer 57 is energized. This supplies plate voltage to X-ray tube 55, and X-rays are produced to expose the photographic film. Relay 51 remains de-energized while the voltage across capacitor 48 keeps the control grid of tube 50 at a potential more negative than the tube's cut-off potential.

As soon as switch 24 is closed and relay 47 is energized, relay contact 46 opens and interrupts the flow of current through resistor 45 to capacitor 48. Consequently, the charge on capacitor 48 immediately begins to leak off through lead 74 and the resistance network including potentiometer 28. As capacitor 48 discharges, the control grid of tube 50 becomes less negative until a point is reached where tube 50 conducts current to energize the coil of relay 51. This opens relay contact 61 so that relay 59 is de-energized, whereupon relay contact 58 opens and X-ray tube 55 is cut off.

Latch 52 now keeps relay contact 61 open, despite the fact that relay coil 51 may become de-energized, so that the X-ray tube cannot be operated again to double-expose the photographic film. However, when drawer 8 is moved to the rear for the purpose of removing cassette 7, switch 31 is closed and this completes a circuit to energize reset coil 53, whereupon latch 52 is raised and relay contact 61 may close. In this way accidental double exposures are substantially eliminated, since the X-ray tube cannot be operated a second time without moving drawer 8 to the rear, which is normally accompanied by the replacement of cassette 7 with another cassette containing unexposed film.

When pressure cone 10 is used, switch 34 automatically disconnects potentiometer 28 and connects potentiometer 29 into the circuit. This circuit change automatically compensates for the thickness of the pressure cone, so that no readjustments of the circuit are required. Consequently there is no opportunity for human error with respect to resetting the timing circuit to compensate for use of the pressure cone.

From the foregoing, it is seen that the film exposure time with the X-ray apparatus described is substantially equal to the time interval required for capacitor 48 to discharge by a certain amount through the resistance network, including either of the potentiometers 28 or 29 selectively, from a potential of —105 volts to a potential equal to the cut-off potential of tube 50. This time interval is related to the time constant of the resistance-capacitance circuit, which depends upon the resistance value of the potentiometer used and thus is a function of the patient's abdominal thickness.

Since the relation between optimum exposure time and abdominal thickness is generally non-linear, best results are obtained when potentiometers 28 and 29 also have non-linear characteristics of resistance variation with changes in shaft position. Special tapered potentiometers can be constructed to provide exposure times corresponding to any desired function of abdominal thickness, and in this way actual exposure times can be made to correspond with optimum exposure times to any desired degree of precision. However, using the circuit shown in Fig. 3, very good correspondence between actual exposure times and optimum exposure times can be obtained with inexpensive, readily available, standard commercial 1 megohm potentiometers having a logarithmic taper, and potentiometers 28 and 29 are preferably of this type. The circuit values herein given for capacitor 48 and for the network resistors provide correct exposure times for an X-ray fluoroscope having a 2-millimeter aluminum filter, an 18 inch distance between the table top and the X-ray tube target, and an X-ray tube operated at 90 kilovolts and 150 milliamperes. With X-ray machines having different characteristics, some modification of the timing circuit's resistance and capacitance values may be desirable.

In making X-ray photographs for a G. I. Series, or barium enema, selector switch 62 is positioned in contact with tap 63, and the exposure time settings are made automatically in the manner hereinbefore described. So that the same X-ray apparatus and timer circuits can be used for making other types of X-ray photographs, the selector switch taps 64 through 69 are provided. When switch 62 is in contact with switch 64, the time constant of the timing circuit is such that an exposure time of 5/10 second is provided, which is suitable for making oblique spine photographs. Tap 65 provides an exposure time of 4/10 second, suitable for thoracic spine photographs. Tap 66 provides an exposure time of 3/10 second, suitable for lumbar spine photographs. Tap 67 provides an exposure time of 2/10 second, suitable for cervical spine photographs. Tap 68 provides an exposure time of 1/10 second, suitable for adult chest photographs. Tap 69 provides an exposure time of 5/100 second, suitable for photographing a child's chest.

When selector switch 62 is in contact with tap 70, the resistance network is open circuited and capacitor 48 discharges at a very slow rate. This switch position may be used when it is desired to make visual observations using fluoroscopic screen 6, since X-ray tube 55 is now operative for any reasonable length of time during which switch 24 is held in the closed position.

Refer now to Fig. 4, which shows the invention applied to a diagnostic type of X-ray machine. In the diagnostic type of machine, the X-ray tube is generally mounted within a housing 81 supported above the top of a horizontal table 82. The photographic film is contained in a cassette 83 which may be held in a sliding drawer 84 just below the thin Bakelite top 85 of the table. Alternatively, cassette 83 may be placed on top of the table between the table top and the subject. The X-ray tube and its housing 81 are generally supported by a bracket 86 mounted on a post 87 which can be moved into various positions with respect to table 82.

The distance between the X-ray tube anode or target and the table top is generally adjustable for example, by sliding the bracket 86 up and down on post 87; but for a given type of X-ray photograph, such as a G. I. Series, a predetermined standard target-to-table distance is generally employed, and the X-ray tube is adjusted to this height before the photograph is made. Consequently, for the best film density and contrast, the exposure time must be related to the abdominal thickness of the subject in the manner hereinbefore described. However, in this type of machine there is no frame or other part which is normally adjusted to a position in contact with the subject's abdomen, and consequently such a part must be provided for purposes of the present invention.

As shown in Fig. 4, a horizontal tubular rod 88 is mounted at the top of a vertical post 89 which can be moved up and down within a bracket 90 attached to table 82, so that the distance between rod 88 and the top of the table can be adjusted to accommodate subjects of different size. Bracket 90 is preferably mounted upon tracks 91 so that it can be moved to different positions along the length of table 82. Alternatively, instead of mounting bracket 90 on table 82, it can be attached to post 87 or supported in any other convenient manner. Rod 88 is slidably mounted in a T 92 attached to the top of post 89, so that rod 88 is always held in a horizontal position, but it can be pushed back out of the way when desired. To hold post 89 in a desired vertical position, a latch 93 is provided which engages teeth on the front side of post 89. Latch 93 may be an annular flat disc fitted within slots of bracket 90, as shown, and movable laterally by a small amount to engage or to disengage the teeth of post 89, selectively. A resilient leaf spring 94 extends upward from bracket 90 and engages a portion of latch 93 so that spring 94 tends to move latch 93 into its engaged position where vertical movement of post 89 is prevented.

When the upper end of spring 94 is moved toward the front of the table, or toward the left in Fig. 4, latch 93 is unlatched and post 89, together with horizontal bar 88, can be moved vertically to adjust the spacing between bar 88 and the top of table 82. For additional convenience in making these adjustments, the rear end of rod 88 may be provided with an enlargement 95 which presses against the upper end of spring 94 when rod 88 is pulled toward the front of table 82, and moves latch 93 to the disengaged position. When bar 88 is pushed back toward the rear of table 82 enlargement 95 moves away from the upper end of spring 94 and the resilience of the spring moves latch 93 into the engaged position.

Attached to the lower end of post 89 is a cable 96 which passes over a pulley 97 and around a drum 98 rotatively mounted on a support 99 attached to bracket 90. The other end of cable 96 is connected to a spring 100 which keeps the cable taut. Drum 98 is connected to the shaft of potentiometer 28' which is connected in place of potentiometer 28 in a timing circuit similar to that shown in Fig. 3.

The apparatus shown in Fig. 4 preferably is used in the following manner: The subject lies upon the top of table 82, and the X-ray tube housing is moved to the desired position with the X-ray tube at a predetermined standard height above the top of the table. The top of spring 94 is pressed toward the left—for example, by grasping bar 88 and pulling it as far as possible toward the front of table 82, and the vertical position of post 89 is adjusted to bring bar 88 into contact with the subject's abdomen. This adjustment of post 89 acts through cable 96 to rotate drum 98 and adjust the resistance of potentiometer 28' to a value which provides the optimum exposure time corresponding to the subject's abdominal thickness.

Rod 88 is then pushed toward the rear of the table and out of the way, and as this is done latch 93 engages the teeth to secure post 89 in the vertical position to which it has been adjusted, so that the adjustment of potentiometer 28' cannot be altered accidentally. A switch is then closed to start operation of the X-ray tube, and the timing circuit automatically stops operation of the tube upon expiration of the optimum exposure time, in the manner hereinbefore explained in connection with Fig. 3.

It will be understood that this invention is not limited to specific embodiments herein illustrated and described, and that the following claims are intended to cover all changes and modifications which do not depart from the true spirit and scope of the invention.

What is claimed is:

1. Self-timing X-ray apparatus providing exposure times automatically related to the thickness of an X-rayed subject, comprising two members adapted to be positioned in contact with opposite portions of the subject to be X-rayed, one of said two members being movable relative to the other of said two members for accommodating subjects of different thickness, means for exciting a source of X-rays for an adjustable time interval, and means automatically adjusting said time interval responsive to changes in the position of said movable member.

2. Self-timing X-ray apparatus providing exposure times automatically related to the thickness of an X-rayed subject, comprising an X-ray tube support means, two members adapted to be positioned in contact with front and back portions respectively of the subject to be X-rayed, one of said two members being movable relative to the other of said two members for accommodating subjects of different thickness, a circuit for supplying electric power to operate the X-ray apparatus, switch means operable to close the circuit and start operation of the X-ray apparatus, timing means operable to open said circuit automatically to stop operation of said tube upon the expiration of an adjustable time interval, and means automatically adjusting said time interval responsive to changes in the position of said movable member.

3. Self-timing X-ray apparatus providing exposure times automatically related to the thickness of an X-rayed subject, comprising an X-ray tube support means, two members adapted to be positioned in contact with front and back portions respectively of the subject to be X-rayed, one of said two members being movable relative to the other of said two members for accommodating subjects of different thickness, a circuit for supplying electric power to operate the X-ray apparatus, first switching means operable to close circuit and start operation of the apparatus, second switching means operable after an adjustable time interval to open the circuit and stop operation of the apparatus, an electrical impedance element having impedance adjustment means connected to said movable member so that said element provides an electrical impedance which is a function of the spacing between said two members, and means controlling the length of said time interval responsive to the electrical impedance value provided by said impedance element.

4. Self-timing X-ray apparatus providing exposure times automatically related to the thickness of an X-rayed subject, comprising two members adapted to be positioned in contact with front and back portions respectively of the subject to be X-rayed, one of said two members being movable relative to the other of said two members for accommodating subjects of different thickness, a potentiometer mechanically connected to said movable member to provide an electrical resistance which is a function of the spacing between said two members, an electrical resistance-capacitance circuit including said potentiometer, said circuit having a time constant which varies with changes in the resistance of said potentiometer, and means for controlling the production of X-rays for a time interval controlled by the time constant of said circuit.

5. Apparatus as in claim 4, in which said potentiometer has a logarithmic taper.

6. Self-timing X-ray apparatus providing exposure times automatically related to the thickness of an X-rayed subject, comprising an X-ray tube support means, two members adapted to be positioned in contact with front and back portions respectively of the subject to be X-rayed, one of said two members being movable relative to the other of said two members for accommodating subjects of different thickness, a potentiometer mechanically connected to said movable member and providing electrical resistance having a value related to the spacing between said two members, a circuit for supplying electric power to excite the X-ray apparatus, first switching means operable to initiate excitation of the apparatus, second switching means operable to stop excitation of said X-ray apparatus, a grid controlled tube with a plate circuit and a grid circuit, a relay connected in said plate circuit to operate said second switching means when said grid controlled tube becomes conductive, a capacitor connected in said grid circuit, means charging said capacitor to a negative voltage which renders said grid controlled tube non-conductive, means disconnecting said charging means from said capacitor upon operation of said first switching means, and a resistance circuit including said potentiometer for discharging said capacitor, so that said grid controlled tube becomes conductive and operates said second switching means upon the expiration of a time interval which depends upon the electrical resistance of said potentiometer.

7. Self-timing X-ray apparatus providing exposure times automatically related to the thickness of an X-rayed subject, comprising an X-ray tube support means, two members adapted to be positioned in contact with front and back portions respectively of the subject to be X-rayed, one of said two members being movable relative to the other of said two members for accommodating subjects of different thickness, a logarithmically tapered potentiometer mechanically connected to said movable member and providing electrical resistance having a value related to the spacing between said two members, first and second relays, circuit means for starting excitation of the X-ray apparatus when said first relay is energized and stopping excitation of the X-ray apparatus when said second relay is energized, circuit means including a switch for energizing said first relay, a thyratron having a control grid, circuit means for energizing said second relay when said thyratron becomes conductive, a capacitor connected in circuit with said control grid, means charging said capacitor to a regulated negative voltage which renders said thyratron non-conductive, means disconnecting said charging means from said capacitor when said first relay is energized, and a discharge circuit including said potentiometer connected in parallel with said capacitor, so that said thyratron becomes conductive and operates said second switching means upon the expiration of a time interval which depends upon the electrical resistance of said potentiometer.

8. Apparatus as in claim 7, in which said second relay has latching means for holding contacts of the second relay in an actuated position after it is once energized, a release switch, and means releasing said latching means upon operation of said release switch.

9. Apparatus as in claim 8, including a photographic film holder movable selectively to a first position for making photographs and to a second position for removing the film, and means operating said release switch when said holder is moved to said second position.

10. Self-timing X-ray apparatus providing exposure times automatically related to the thickness of an X-rayed subject, comprising a table adapted to contact one portion of the subject to be X-rayed, a movable member adapted to contact an opposite portion of said subject, the spacing between said member and said table being adjustable to accommodate subjects of different thickness, means for exciting the X-ray apparatus for an adjustable time interval, and means automatically adjusting said time interval in accordance with the spacing between said movable member and said table.

11. Self-timing X-ray apparatus providing exposure times automatically related to the thickness of an X-rayed subject, comprising a table, a frame parallel with and spaced apart from said table, means for adjusting the spacing between said table and said frame, a potentiometer providing an adjustable value of electrical resistance, means automatically adjusting the resistance of said potentiometer in accordance with the spacing between said table and said frame, and means for controlling the excitation of X-ray apparatus for a time interval controlled by the value of said resistance.

12. Self-timing X-ray apparatus providing exposure times automatically related to the thickness of an X-rayed subject, comprising a table, a frame parallel with and spaced apart from said table, a pressure cone attached to said frame between said frame and said table, said cone being movable with respect to said frame to a first or a second position selectively, means for adjusting the spacing between said table and said frame so that the subject to be X-rayed can be positioned between and in contact with the table and the frame when said cone is in said first position and so that said subject can be positioned between and in contact with the table and the pressure cone when said cone is in said second position, first and second potentiometers, means automatically adjusting the resistance of said first potentiometer in accordance with the spacing between said table and said frame and automatically adjusting the resistance of said second potentiometer in accordance with the spacing between said table and said cone, a timing circuit, means automatically connecting said first potentiometer in said timing circuit when said cone is in said first position and said second potentiometer in said timing circuit when said cone is in said second position, and means for controlling the excitation of the X-ray apparatus over a time interval determined by the value of resistance connected in said timing circuit.

13. Self-timing X-ray apparatus providing exposure times automatically related to the thickness of an X-rayed subject, comprising a table having a horizontal top adapted to support the subject to be X-rayed, an X-ray tube mounted below said table top, a horizontal frame above said table top, means for adjusting the spacing between said frame and said table top to bring the bottom of said frame into contact with said subject, means supported by said frame for holding a photographic film, a potentiometer, means automatically adjusting the electrical resistance of said potentiometer in accordance with the spacing between said table and said frame, and means operating said X-ray tube for a time interval controlled by the value of said resistance.

14. Self-timing X-ray apparatus providing exposure times automatically related to the thickness of an X-rayed subject, comprising a table, a frame parallel with and spaced apart from said table, a post supporting said frame, said frame being movable along said post for adjusting the spacing between said frame and said table, a rack attached to said post, a gear rotatively mounted on said frame, said gear engaging said rack so that the gear is rotated as said frame is moved along said post, a potentiometer mechanically connected to said gear to provide an electrical resistance related in value to the spacing between said frame and said table, and means for exciting the X-ray apparatus for a time interval controlled by the value of said resistance.

15. Self-timing X-ray apparatus providing exposure times automatically related to the thickness of an X-rayed subject, comprising a table having a horizontal top adapted to support the subject to be X-rayed, a holding means for an X-ray tube located above and spaced apart from said table top, a horizontal bar above and spaced apart from said table top, means for moving said bar vertically for adjusting the spacing between said bar and said table top to bring said bar into contact with said subject, a potentiometer, means automatically adjusting the electrical resistance of said potentiometer in accordance with the spacing between said bar and said table top, and means exciting the X-ray apparatus for a time interval controlled by the value of said resistance.

References Cited in the file of this patent
UNITED STATES PATENTS

| | | |
|---|---|---|
| 2,220,951 | Borden | Nov. 12, 1940 |
| 2,641,701 | Moore | June 9, 1951 |